United States Patent [19]
Gregoire

[11] Patent Number: 6,133,784
[45] Date of Patent: Oct. 17, 2000

[54] FAST SETTLING HIGH PASS FILTER WITH CORNER FREQUENCY ADJUSTING CIRCUIT

[75] Inventor: Bernard R. Gregoire, Pocatello, Id.

[73] Assignee: Texas Instruments Incorporated, Dallas, Tex.

[21] Appl. No.: 09/198,076

[22] Filed: Nov. 23, 1998

Related U.S. Application Data

[60] Provisional application No. 60/066,895, Nov. 25, 1997.

[51] Int. Cl.[7] .................................................. H03K 5/00
[52] U.S. Cl. ........................................ 327/559; 327/553
[58] Field of Search .................................. 327/553, 552, 327/559, 311; 330/305, 107, 105

[56] References Cited

U.S. PATENT DOCUMENTS 4,790,018  12/1988  Preves et al. .......................... 381/68.2

FOREIGN PATENT DOCUMENTS 405259809  10/1993  Japan ....................................... 327/553

*Primary Examiner*—Dinh T. Le
*Attorney, Agent, or Firm*—W. Daniel Swayze, Jr.; W. James Brady, III; Frederick J. Telecky, Jr.

[57] ABSTRACT

A fast settling high pass filter with a corner frequency adjusting circuit comprises a high pass filter having an output, the high pass filter operable to receive a feedback signal that is proportional to its output, wherein the feedback signal is operable to adjust the corner frequency of the high pass filter. An attenuating circuit may be coupled to the output of the high pass filter, the attenuating circuit may operate to receive the output of the high pass filter and attenuate the output to form the feedback signal.

12 Claims, 2 Drawing Sheets

FAST SETTLING HIGH PASS FILTER WITH CORNER FREQUENCY ADJUSTING CIRCUIT

This application claims priority under 35 USC § 119(e)(1) of provisional application Ser. No, 60/066,895 filed Nov. 25, 1997.

TECHNICAL FIELD OF THE INVENTION

This invention relates generally to the field of information storage and more particularly to a fast settling high pass filter with a corner frequency adjusting circuit.

BACKGROUND OF THE INVENTION

As computer hardware and software technology continues to progress, the need for larger and faster mass storage devices for storing computer software and data continues to increase. Electronic databases and computer applications such as multimedia applications require large amounts of disk storage space. An axiom in the computer industry is that there is no such thing as enough memory and disk storage space. Mass storage device manufacturers strive to produce high speed hard disk drives with large data capacities at lower and lower costs.

A high speed hard disk drive is one that can store and retrieve data at a fast rate. A disk drive performs write and read operations when storing and retrieving data, respectively. A typical disk drive performs a write operation by transferring data from a host interface to its control circuitry. The control circuitry then stores the data in a local dynamic random access memory (DRAM). A control circuitry processor schedules a series of events to allow the information to be transferred to the disk platters through a write channel. The control circuitry moves the read/write heads to the appropriate track and locates the appropriate sector of the track. Finally, the disk drive control circuitry transfers the data from the DRAM to the located sector of the disk platter through the write channel. A sector generally has a fixed data storage capacity, such as 512 bytes of data per sector. A write clock controls the timing of a write operation in the write channel. The write channel may encode the data so that the data can be more reliably retrieved later.

In a read operation, the appropriate sector to be read is located and data that has been previously written to the disk is read. The read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the signal to an appropriate level using automatic gain control techniques. The read channel then filters the signal, to eliminate unwanted high frequency noise, equalizes the channel, detects "zeros" and "ones" from the signal, and formats the binary data for the control circuitry. The binary or digital data is then transferred from the read channel to the control circuitry and is stored in the DRAM of the control circuitry. The processor then communicates to the host that data is ready to be transferred. A read clock controls the timing of a read operation in the read channel.

Preamplification circuits in disk drive systems typically include a differential pair of transistors coupled to a high-pass filter circuit. Occasionally, during a read or write operation, the read/write heads may contact the surface of the disk platter, causing the heads to heat up and creating large thermal transient signals. These transient signals may disrupt proper system operation by saturating the amplifiers within the preamplifier circuit. Thermal transient signals are typically comprised of primarily low frequency components. One method of substantially eliminating adverse effects of thermal transient signals is to adjust the bandwidth of high pass filters within the preamplification circuit to reject more low frequency components. This eliminates slow settling low frequency components of the transient signals. High frequency components settle quickly and are, thus, less likely to disrupt system operation.

One approach to modifying the bandwidth of the high-pass filters is to adjust the bias current supplying a differential pair of transistors in the feedback loop. A problem with this approach is that changing the bias current itself creates large, slow settling transient signals. In addition, transistor mismatches often create slow settling transient responses. Problems in dissipating these slow settling transients are exacerbated when the transients are amplified in the subsequent amplification stages that are typically used in conventional designs.

Another approach to modifying the bandwidth of the high-pass filters is to cross-couple the differential pair of transistors in the feedback loop. This approach, however, also suffers from problems associated with slow settling transients caused by mismatched transistors. In addition, this approach results in inefficient power consumption.

SUMMARY OF THE INVENTION

In accordance with the teachings of the present invention, a fast settling high pass filter with a corner frequency adjusting circuit is provided that eliminates or substantially reduces problems associated with prior approaches. According to one embodiment of the present invention, a corner frequency adjusting circuit comprises a high pass filter having an output, the high pass filter operable to receive a feedback signal that is proportional to its output, wherein the feedback signal is operable to adjust the corner frequency of the high pass filter. The invention further comprises an attenuating circuit coupled to the output of the high pass filter, the attenuating circuit operable to receive the output of the high pass filter and attenuate the output to form the feedback signal.

The present invention has important technical advantages. The bandwidth of the high pass filter is controlled by attenuating the output of the high pass filter. Because the differential DC output of the high pass filter is nearly zero, using it to control the bandwidth of the filter does not affect the operating point of any circuit elements. Thus, the present invention does not create large slow settling transients when modifying the bandwidth of the system. The attenuating circuit may reside at the output side of an amplifier within the circuit. This provides an advantage of avoiding amplification of any small transient signals that may be created in operating the attenuating circuit. In addition, the invention provides more efficient power consumption than prior approaches.

BRIEF DESCRIPTION OF THE DRAWINGS

A more complete understanding of the teachings of the present invention may be acquired by referring to the accompanying figures in which like reference numbers indicate like features and wherein.

DETAILED DESCRIPTION OF THE INVENTION

Figure 1:
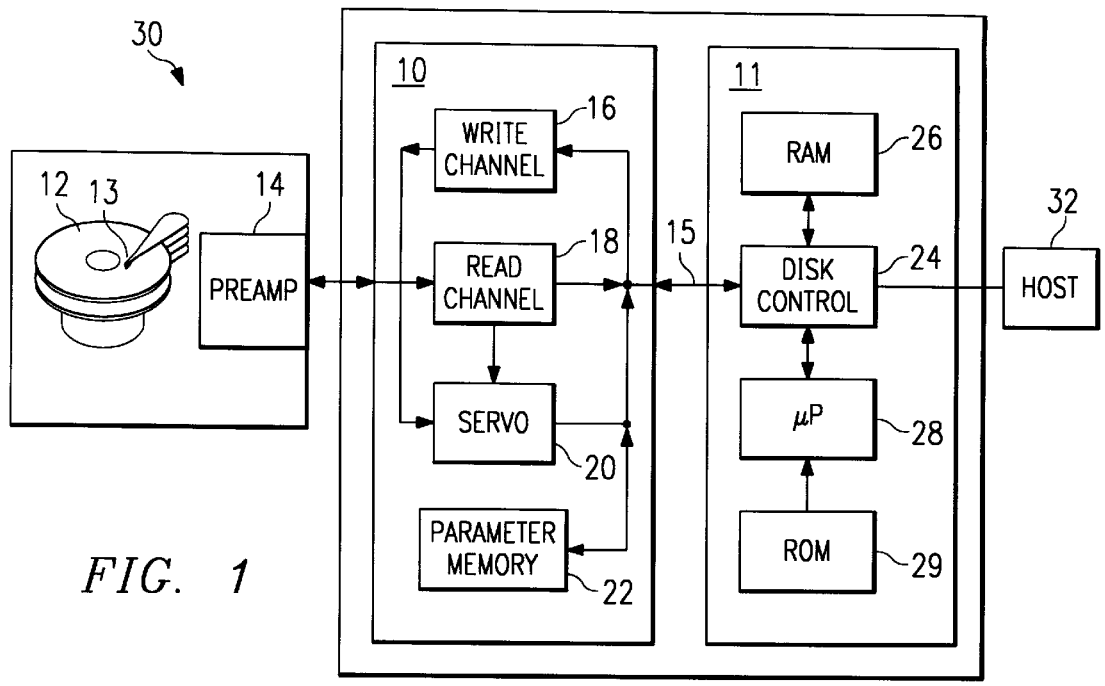
FIG. 1 is a block diagram illustrating an exemplary disk drive mass storage system.

FIG. 1 is a block diagram of a disk drive mass storage system 30 used for retrieving data during read operations and for storing data during write operations. Disk drive mass storage system 30 interfaces and exchanges data with a host 32 during read and write operations. Disk drive mass storage system 30 includes a disk/head assembly 12, a preamplifier 14, a synchronously sampled data (SSD) channel 10, and a control circuit 11. Disk/head assembly 12 and preamplifier 14 are used to magnetically store data. SSD channel 10 and control circuitry 11 are used to process data that is being read from and written to disk/head assembly 12 and to control the various operations of disk drive mass storage system 30. Host 32 exchanges digital data with control circuitry 11.

Disk/head assembly 12 includes a number of rotating magnetic disks or platters used to store data that is represented as magnetic transitions on the magnetic platters. Read/write heads 13 of disk/head assembly 12 are used to store and retrieve data from each side of the magnetic platters. Read/write heads 13 may comprise any type of available read/write heads such as magneto-resistive heads. Preamplifier 14 serves as an interface between read/write heads 13 of disk/head assembly 12 and SSD channel 10, and provides amplification to the waveform data signals as needed.

SSD channel 10 is used during read and write operations to exchange analog data signals with disk/head assembly 12 through preamplifier 14 and to exchange digital data signals with control circuitry 11 through a data/parameter path 15. SSD channel 10 includes a write channel 16, a read channel 18, a servo control 20, and a parameter memory 22. SSD channel 10 may be implemented as a single integrated circuit.

During write operations, write channel 16 receives digital data from control circuitry 11 in parallel format through data/parameter path 15. A serial format could also be used. The digital data is reformatted or coded for storage and provided to disk/head assembly 12. Write channel 16 may include a register, a scrambler, a phase locked loop, an encoder, a serializer, and a write precompensation circuit. The operation and timing of write channel 16 is controlled by a write clock signal.

During read operations, read channel 18 receives analog data signals from read/write heads 13 of disk/head assembly 12 through preamplifier 14. Read channel 18 conditions, decodes, and formats the analog data signal and provides a digital data signal in parallel format to control circuitry 11 through data/parameter path 15. Read channel 18 includes any of a variety of circuit modules such as an automatic gain control circuit, a low pass filter, a variable frequency oscillator, a sampler, an equalizer, such as a finite impulse response filter, a maximum likelihood, partial response detector, a deserializer, and a synchronization field detection circuit. The operation of read channel 18 is described more fully below in the description of FIG. 2.

Some of the various circuit modules of read channel 18 may receive operational parameters for enhanced or optimal performance. The operational parameters are generally calculated during burn-in but may be calculated at other times. The operational parameters are designed to account for the various physical and magnetic characteristics of disk drive mass storage system 30 that vary from system to system and influence operational performance. During start-up, the operational parameters are provided to SSD channel 10 from control circuitry 11 through data/parameter path 15. Parameter memory 22 stores the operational parameters. The various circuit modules of read channel 18 may then access the operational parameters from parameter memory 22 during read operations.

Servo control 20 may provide position error signals (PES) to control circuitry 11 during read and write operations. The PES relate to the position of the heads of disk/head assembly 12 so that the heads can be properly positioned during both read and write operations.

Control circuitry 11 is used to control the various operations of disk drive mass storage system 30 and to exchange digital data with SSD channel 10 and host 32. Control circuitry 11 includes a microprocessor 28, a disk control 24, a random access memory (RAM) 26, and a read only memory (ROM) 29. Microprocessor 28, disk control 24, RAM 26, and ROM 29 together provide control and logic functions to disk drive mass storage system 30 so that data may be received from host 32, stored, and later retrieved and provided back to host 32. ROM 29 includes preloaded microprocessor instructions for use by microprocessor 28 in operating and controlling disk drive mass storage system 30. ROM 29 may also include the operational parameters, discussed above, that are supplied to parameter memory 22 during start-up. RAM 26 is used for storing digital data received from host 32 before being supplied to SSD channel 10 and received from SSD channel 10 before being supplied to host 32. RAM 26 may also provide data to microprocessor 28 and store data or results calculated by microprocessor 28. Disk control 24 includes various logic and bus arbitration circuitry used in properly interfacing disk drive mass storage system 30 to host 32 and for internally interfacing control circuitry 11 to SSD channel 10. Depending on the circuit implementation, any of a variety of circuitry may be used in disk control 24.

In operation, disk drive mass storage system 30 goes through an initialization or start-up routine when power is initially provided. One such routine instructs microprocessor 28 to supply operational parameters, previously stored in ROM 29, to parameter memory 22 of SSD channel 10 through data/parameter path 15. The operational parameters are then stored in memory registers of parameter memory 22 for use by read channel 18 during a read operation.

After the initialization routine is complete, data may be read from or written to disk/head assembly 12. Servo control 20 provides location information so that read/write heads 13 may be properly positioned on the disks to read and write data. In general, the operation of disk drive mass storage system 30 may be divided into read operations and non-read operations. Read operations involve the reading of data from the disks of disk head assembly 12 and non-read operations include write operations, servo operations, and times when the system is idle. Clock signals control both read operations and non-read operations.

During a read operation, host 32 initiates a request for data. After the read/write heads of disk/head assembly 12 are properly positioned, an analog data signal is provided to preamplifier 14. Read channel 18 receives the analog data signal from preamplifier 14, processes the analog data signal, and provides a corresponding digital data signal. This involves using various circuitry modules and techniques for synchronously sampling the analog data signal and detecting a digital signal. A read clock signal ensures that the data signal is synchronously sampled in the correct manner. Read channel 18 provides the digital data signal to disk control 24 through data/parameter path 15. Disk control 24 provides various digital logic control and arbitration circuitry between SSD channel 10, host 32, RAM 26, microprocessor 28, and ROM 29 during both read and write operations. The digital data is then stored in RAM 26 until microprocessor 28 communicates to host 32 that the data is ready to be transferred. Host 32 may be a system bus such as the system bus of a personal computer.

During a write operation, a digital data signal is received from host 32 and ultimately stored on disk/head assembly 12. Digital data is initially provided from host 32 to control circuitry 11. Control circuitry 11 stores the digital data in RAM 26. Microprocessor 28 schedules a series of events so that the data may then be transferred from RAM 26 to disk/head assembly 12, through write channel 16. This data exchange occurs through data/parameter path 15. RAM 26 first provides the data to write channel 16. Write channel 16 encodes the digital data and places the data in serial format. Write channel 16 then provides the data to disk/head assembly 12 after read/write heads 13 of disk/head assembly 12 have been properly positioned to write or store the data at an appropriate location on the disk. The operation and timing of write channel 16 is controlled by a write clock signal.

The circuitry illustrated in FIG. 1 provides only one example of circuitry that can be used to control a disk drive. Other circuitry can be used without departing from the scope of the invention.

Occasionally, read/write head 13 may contact one of the disks causing read/write head 13 to heat up, which, in turn, creates a large transient signal. Thermal transient signals are typically comprised of a majority of low frequency components. In normal operating mode, these slow settling low frequency components may propagate through and disrupt the system. To ensure that the transient signal settles quickly, it is desirable to provide a method of modifying the bandwidth of system 30 such that the slow settling low frequency components of the transient signal are rejected. This may be accomplished, for example, by adjusting the corner frequency of a high pass filter in preamplifier circuit 14 to allow only high frequency signals to propagate.

Figure 2:
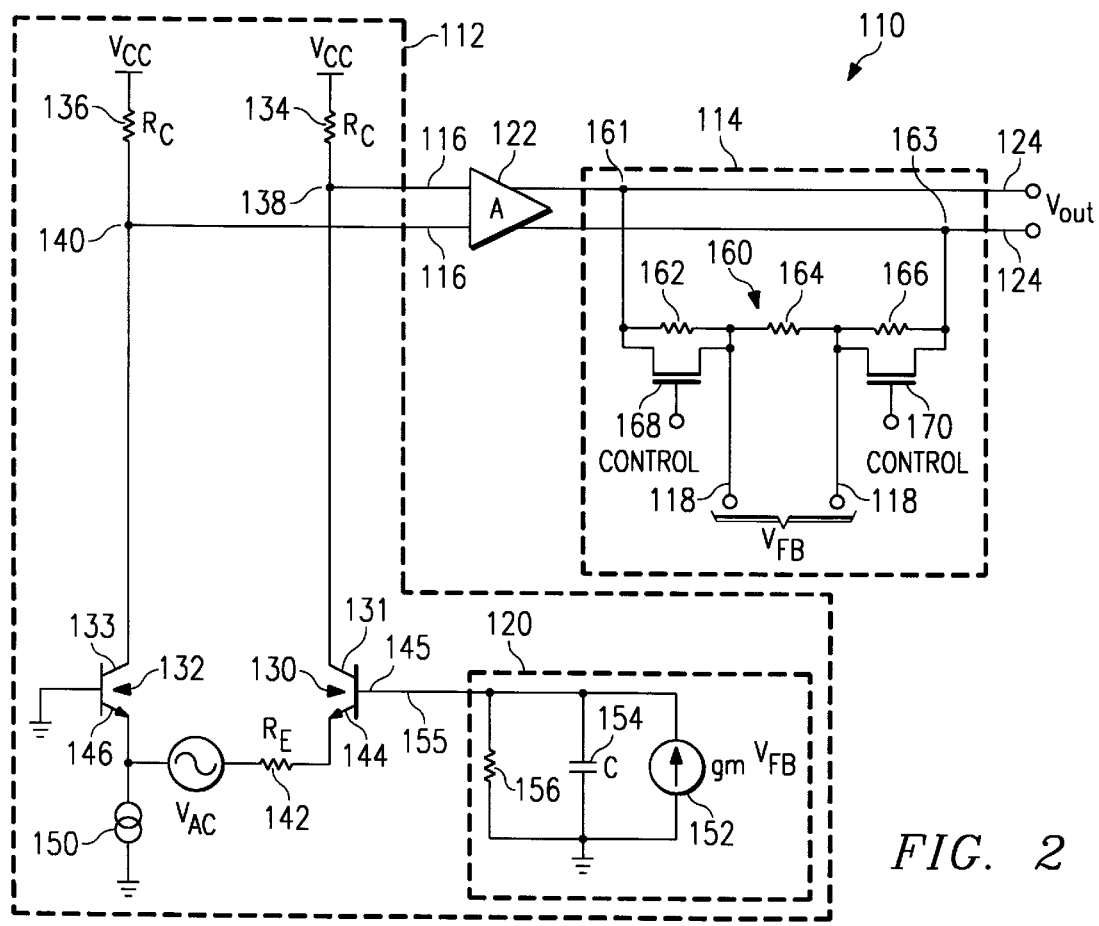
FIG. 2 is a schematic diagram illustrating one embodiment of a corner frequency adjusting circuit constructed according to the teachings of the present invention.

FIG. 2 is a schematic diagram illustrating one embodiment of a corner frequency adjusting circuit 110 constructed according to the teachings of the present invention. Corner frequency adjusting circuit 110 may reside within preamplifier circuit 14 of FIG. 1. Corner frequency adjusting circuit 110 may comprise a high pass filter 112 coupled to an attenuating circuit 114. Attenuating circuit 114 may receive differential outputs 116 from high pass filter 112. Attenuating circuit 114 may attenuate output signals 116 to form a feedback signal 118. Feedback signal 118 may be passed back to a voltage-controlled voltage source 120 of high pass filter 112. An amplifier 122 may be coupled to the outputs 116 of high pass filter 112. Amplifier 122 may, for example, be coupled between outputs 116 of high pass filter 112 and the inputs of attenuating circuit 114. This configuration provides an advantage of minimizing amplification of any transients created in operating attenuation circuit 114, since any such transients would be isolated from amplifier 122. In another embodiment, amplifier 122 may be coupled to the output side 124 of attenuating circuit 114 (not explicitly shown). In still another embodiment, amplifier 122 may reside within preamplifier circuit 14 to amplify an input signal VAC prior to input signal VAC reaching high pass filter 112. Input signal VAC represents an analog input signal received from one of the read/write heads 13.

High pass filter 112 may comprise a differential pair of transistors 130 and 132. Transistors 130 and 132 may comprise, for example, N-P-N or P-N-P bipolar junction transistors, or MOSFETs. Although the illustrated embodiments employ bipolar junction transistors, MOSFETs could be substituted without departing from the scope of the invention. The collectors 131 and 133 of transistors 130 and 132, respectively, may be coupled to collector loads 134 and 136, respectively. Collector loads 134 and 136 may be resistors chosen to provide particular characteristics of high pass filter 112. Differential output nodes 138 and 140 reside between transistors 130/132 and collector loads 134/136, respectively. A DC bias current source 150 may be coupled to emitters 144 and 146 of transistors 130 and 132, respectively. An emitter load 142 may be coupled between emitter 144 of transistor 130 and current source 150.

A voltage-controlled voltage source 120 may be coupled to base 145 of transistor 130. Voltage-controlled voltage source 120 may include a voltage-controlled current source 152 operable to receive feedback signal 118 from attenuating circuit 114, and to generate a counteracting signal 155 that is proportional to feedback signal 118. Voltage-controlled current source 152 may be coupled between ground and base 145 of transistor 130. Voltage-controlled voltage source 120 may further comprise a capacitor 154 coupled in parallel with voltage-controlled current source 152 at base 145 of transistor 130. Voltage-controlled voltage source 120 may optionally include a resistor 156 coupled in parallel with capacitor 154 and voltage-controlled current source 152 at base 145 of transistor 130.

Attenuating circuit 114 may comprise, for example, a differential voltage divider 160 coupled between output nodes 161 and 163. Any other type of attenuating circuit could be used without departing from the scope of the invention. Differential voltage divider 160 may comprise, for example, a plurality of resistors 162, 164, and 166 connected in series between differential nodes 161 and 163. Differential voltage divider 160 may comprise any number of resistors for facilitating various levels of attenuation. Control transistors 168 and 170 may be coupled across resistors 162 and 166, respectively. Control transistors 168 and 170 may comprise any transistors suitable to function as a control element in a voltage divider circuit. For example, control transistors 168 and 170 may comprise MOSFET transistors or bipolar junction transistors. Feedback signal 118 ($V_{FB}$) may be obtained by monitoring the voltage across resistor 164. By selecting appropriate values for resistors 162, 164, and 166, voltage divider 160 may provide an attenuation factor $\alpha$, such that feedback signal 118 is equal to $\alpha$ times output voltage $V_{OUT}$ of high pass filter 112 or amplifier 122, depending on the circuit configuration used.

Amplifier 122 may comprise any circuitry operable to receive a differential input signal and to amplify that signal by a given factor, A. Amplifier 122 may comprise, for example, a differential pair of transistors having collector loads $R_C$ coupled to the collectors of the transistors, and an emitter load $R_E$ coupled to the emitters of the transistors (not explicitly shown). The gain factor A in such an amplifier is approximately equal to the ratio of the collector resistance to the emitter resistance. Thus, collector resistance $R_C$ and emitter resistance $R_E$ may be chosen to provide the desired gain factor, A.

In operation, high pass filter 112 receives an input signal, $V_{AC}$, from one of the read/write heads 13, or from amplifier 122, depending upon the circuit configuration used. DC bias current source 150 drives transistors 130 and 132 to pass an amplified version of input signal $V_{AC}$ through transistors 130 and 132. Voltage-controlled voltage source 120 receives feedback signal 118 from attenuating circuit 114. Voltage-controlled voltage source 120 generates a counteracting signal 155 that is proportional to feedback signal 118. At low frequencies, counteracting signal 155 is passed to base 145 of transistor 130, which suppresses input signal $V_{AC}$ so that little or no signal appears at differential output nodes 138 and 140. At higher frequencies, capacitor 154 begins to short base 145 of transistor 130 to ground, which prevents counteracting signal 155 from completely suppressing input signal $V_{AC}$. Thus, at least a portion of input signal $V_{AC}$ propagates to differential output nodes 138 and 140. At frequencies somewhat above the lower −3 dB point, capacitor 154 completely shorts base 145 to ground, which isolates input signal $V_{AC}$ from counteracting signal 155, and allows input signal $V_{AC}$ to pass unobstructed to output nodes 138 and 140.

Input signal $V_{AC}$ may be amplified through appropriate selection of collector loads 134, 136 and emitter load 142. In addition, amplifier 122 may further amplify this signal by an amplification factor, A. Although amplifier 122 is shown coupled between high pass filter 112 and attenuating circuit 114, as described above, it could alternatively reside prior to the input of high pass circuit 112 or at the output side 124 of attenuating circuit 114. The following discussion assumes an embodiment wherein amplifier 122 resides between high pass circuit 112 and attenuating circuit 114.

Attenuating circuit 114 receives differential outputs from amplifier 122 and, depending on the status of control transistors 168 and 170, attenuates the input signal by an attenuation factor, α, to generate feedback signal $V_{FB}$. The corner frequency of high pass filter circuit 112 may be approximated by the equation:

$$F_{3DB} \approx \left(\frac{g_m}{C}\right) \times \left(\frac{2R_C}{R_E}\right) \times (A) \times (\alpha),$$

where $g_m$ is the transconductance of the feedback loop; C is the capacitance of capacitor 154; $R_C$ is the resistance of collector loads 134 and 136; $R_E$ is the resistance of the emitter load 142; A is the gain factor of amplifier 122; and α is the attenuation factor of attenuating circuit 114. As shown by this equation, the corner frequency, $F_{3dB}$, is directly proportional to the attenuation factor α. Thus, the corner frequency and bandwidth may be adjusted by varying the attenuation factor α. This characteristic may be useful in increasing the operating frequency of circuit 110 upon encountering a large transient signal.

For example, during normal read operation of the circuit, corner frequency adjusting circuit 110 may operate in an attenuated mode. That is, attenuation circuit 112 may provide a feedback signal 118 attenuated by attenuation factor α. The attenuation factor, when operating in attenuated mode may be, for example, 0.1. Upon encountering a large transient signal, control signals 168 and/or 170 may be used to change circuit 110 from an attenuated mode to a squelch mode. In squelch mode, the attenuation factor may be, for example, 1.0. Changing, or eliminating, the attenuation in feedback signal 118 acts to increase the corner frequency of filter 112, thus rejecting the slow settling low frequency components of the thermal transient, and allowing only the fast settling high frequency components to pass. This forces the thermal transient signal to settle quickly without disrupting the system. Once the transient signal settles, circuit 110 may be returned to its normal operating bandwidth by enabling attenuating circuit 114 through control signals 168 and 170.

Figure 3:
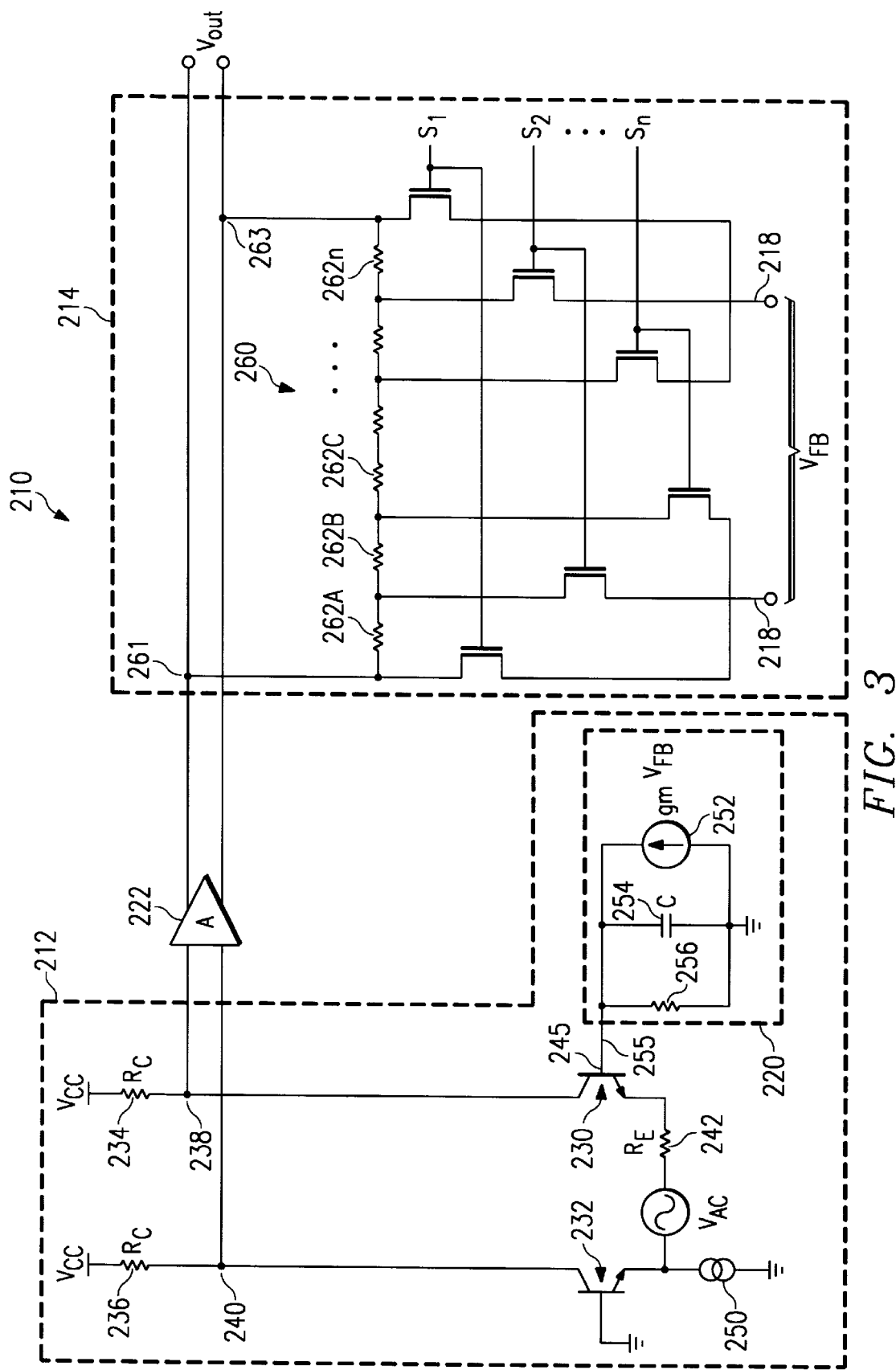
FIG. 3 is a schematic diagram illustrating another embodiment of a corner frequency adjusting circuit constructed according to the teachings of the present invention.

FIG. 3 is a schematic diagram illustrating another embodiment of a corner frequency adjusting circuit 210 constructed according to the teachings of the present invention. Corner frequency adjusting circuit 210 is similar in structure and function to corner frequency adjusting circuit 110 shown in FIG. 2. Corner frequency adjusting circuit 210 may comprise a high pass filter 212 coupled to an attenuating circuit 214. High pass filter 212 is similar in structure and function to high pass filter 112 of FIG. 2.

An amplifier 222 may be coupled to the outputs of high pass filter 212. Amplifier 222 is similar in structure and function to amplifier 122 of FIG. 2. Amplifier 222 may reside in a variety of locations within circuit 210. For example, amplifier 222 may be coupled between outputs 216 of high pass filter 212 and the inputs of attenuating circuit 214; to the output side 224 of attenuating circuit 214 (not explicitly shown); or may reside within preamplifier circuit 14 to amplify an input signal $V_{AC}$ prior to input signal $V_{AC}$ reaching high pass filter 212.

In this embodiment, attenuating circuit 214 comprises a tapped resistor network 260. Tapped resistor network 260 may comprise any combination of resistive loads and switches operable to provide one of a plurality of output voltages proportional to an input voltage received. In a particular embodiment, tapped resistor network 260 comprises a plurality of resistors 262a–262n coupled in series between output nodes 261 and 263. A plurality of switches $S_1$–$S_n$ are coupled across sets of resistors 262a–262n. Switches $S_1$–$S_n$ may comprise any circuit elements operable to enable or disable selected load elements 262a–262n. For example, switches $S_1$–$S_n$ may comprise MOSFET or bipolar junction transistors. Switches $S_1$–$S_n$ may be selectively activated to provide a feedback voltage $V_{FB}$ which is an attenuated version of the input voltage received. Any number of resistors and switches may be implemented to realize a desired resolution in attenuation.

Attenuating circuit 214 may receive differential outputs 216 from high pass filter 212, and attenuate signals 216 to form a feedback signal 218. Feedback signal 218 may be passed back to a voltage-controlled voltage source 220 of high pass filter 212. Voltage-controlled voltage source 220 is similar in structure and function to voltage-controlled voltage source 120 of FIG. 1.

In operation, corner frequency adjusting circuit 210 operates similarly to corner frequency adjusting circuit 110 of FIG. 1. At low frequencies, voltage-controlled voltage source 220 generates a counteracting signal 245, which is proportional to feedback signal 218 received from attenuating circuit 214. At low frequencies, counteracting signal 245 suppresses input signal $V_{AC}$ resulting in little or no output at differential output nodes 238 and 240. At higher frequencies, capacitor 254 begins to short base 245 of transistor 230 to ground, allowing at least a portion of input signal $V_{AC}$ to pass to output nodes 238 and 240. At frequencies above the lower 3dB corner frequency, capacitor 254 completely shorts base 245 to ground, allowing most or all of input signal $V_{AC}$ to propagate to differential output nodes 238 and 240.

Switches $S_1$–$S_n$ operate to provide a desired attenuation factor α. During normal read operation, attenuating circuit 214 may operate to attenuate feedback signal 218 by a factor of, for example 0.1. Upon encountering a large transient signal, switches $S_1$–$S_n$ may be adjusted to change circuit 210 from an attenuated mode to a squelch mode. In squelch mode, the attenuation factor may be, for example, 1.0. Changing, or eliminating, the attenuation in feedback signal 218 acts to increase the corner frequency of filter 212, thereby rejecting the slow settling low frequency components of the thermal transient, and allowing only the fast settling high frequency components to pass. This forces the thermal transient signal to settle quickly without disrupting the system. Once the transient signal settles, circuit 210 may be returned to its normal operating bandwidth by adjusting switches $S_1$–$S_n$ appropriately.

The corner frequency adjustment techniques disclosed herein are particularly useful in disk drive control circuitry. However, the invention can be used in any circuit where it is desirable to damp out periodic low frequency transients.

Although the present invention has been described in detail it should be understood that various changes and substitutions may be made hereto without departing from the scope of the present invention as defined by the appended claims.

What is claimed is:

1. A corner frequency adjusting circuit, comprising:
   a high pass filter having an output, the high pass filter operable to receive a feedback signal that is proportional to the output; and
   an attenuating circuit coupled to the output of the high pass filter, the attenuating circuit operable to receive the output of the high pass filter and attenuate the output to form the feedback signal, wherein the feedback signal is operable to adjust the corner frequency of the high pass filter,
   wherein the high pass filter comprises:
      a transistor coupled to the output of the high pass filter; and
      a voltage-controlled voltage source coupled to a terminal of the transistor, the voltage-controlled voltage source operable to receive the feedback signal from the attenuating circuit and to generate a counteracting signal that is proportional to the feedback signal.

2. The circuit of claim 1, wherein the attenuating circuit comprises a differential voltage divider circuit.

3. The circuit of claim 1, wherein the attenuating circuit comprises a tapped resistor network.

4. The circuit of claim 1, wherein the voltage-controlled voltage source comprises:
   a capacitor coupled to the terminal of the transistor; and
   a voltage-controlled current source coupled to the terminal of the transistor, the voltage-controlled current source operable to receive the feedback signal from the attenuating circuit and to generate said counteracting signal that is proportional to the feedback signal.

5. The circuit of claim 1, further comprising an amplifier coupled to the output of the high pass filter.

6. A corner frequency adjusting circuit, comprising:
   a high pass filter having an output, the high pass filter operable to receive a feedback signal that is proportional to the output; and
   an attenuating circuit coupled to the output of the high pass filter, the attenuating circuit operable to receive the output of the high pass filter and attenuate the output to form the feedback signal, wherein the feedback signal is operable to adjust a corner frequency of the high pass filter,
   wherein the output is a differential output, and wherein the high pass filter comprises:
      a differential pair of bipolar junction transistors, the collector of each transistor coupled to the differential output; and
      a voltage-controlled voltage source coupled to the base of one of the transistors, the voltage-controlled voltage source operable to receive the feedback signal from the attenuating circuit and to generate a counteracting signal that is proportional to the feedback signal.

7. A disk drive comprising:
   a read head operable to interface with a storage device; and
   a preamplifier circuit coupled to the read head, the preamplifier circuit including a corner frequency adjusting circuit comprising:
      a high pass filter having an output, the high pass filter operable to receive a feedback signal that is proportional to its output; and
      an attenuating circuit coupled to the output of the high pass filter, the attenuating circuit operable to receive the output of the high pass filter and attenuate the output to form the feedback signal, wherein the feedback signal is operable to adjust the corner frequency of the high pass filter,
   wherein the high pass filter comprises:
      a transistor coupled to the output of the high pass filter; and
      a voltage-controlled voltage source coupled to a terminal of the transistor, the voltage-controlled voltage source operable to receive the feedback signal from the attenuating circuit and to generate a counteracting signal that is proportional to the feedback signal.

8. The disk drive of claim 7, wherein the attenuating circuit comprises a differential voltage divider circuit.

9. The disk drive of claim 7, wherein the attenuating circuit comprises a tapped resistor network.

10. The disk drive of claim 7, wherein the voltage-controlled voltage source comprises:
    a capacitor coupled to the terminal of the transistor; and
    a voltage-controlled current source coupled to the terminal of the transistor, the voltage-controlled current source operable to receive the feedback signal from the attenuating circuit and to generate said counteracting signal that is proportional to the feedback signal.

11. A disk drive comprising:
    a read head operable to interface with a storage device; and
    a preamplifier circuit coupled to the read head, the preamplifier circuit including a corner frequency adjusting circuit comprising:
       a high pass filter having an output, the high pass filter operable to receive a feedback signal that is proportional to the output; and
       an attenuating circuit coupled to the output of the high pass filter, the attenuating circuit operable to receive the output of the high pass filter and attenuate the output to form the feedback signal, wherein the feedback signal is operable to adjust the corner frequency of the high pass filter,
    wherein the output of the high pass filter is a differential output, and wherein the high pass filter comprises:
       a differential pair of bipolar junction transistors, the collector of each transistor coupled to the differential output; and
       a voltage-controlled voltage source coupled to the base of one of the transistors, the voltage-controlled voltage source operable to receive the feedback signal from the attenuating circuit and to generate a counteracting signal that is proportional to the feedback signal.

12. The disk drive of claim 7, further comprising an amplifier coupled to the output of the high pass filter.

* * * * *